United States Patent
Divakaran et al.

(10) Patent No.: US 7,375,731 B2
(45) Date of Patent: May 20, 2008

(54) VIDEO MINING USING UNSUPERVISED CLUSTERING OF VIDEO CONTENT

(75) Inventors: Ajay Divakaran, Denville, NJ (US); Kadir A. Peker, North Arlington, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 89 days.

(21) Appl. No.: 10/285,831

(22) Filed: Nov. 1, 2002

(65) Prior Publication Data

US 2004/0085323 A1    May 6, 2004

(51) Int. Cl.
G09G 5/00       (2006.01)
H04N 9/475      (2006.01)
H04N 7/12       (2006.01)
H04N 7/00       (2006.01)
H04N 11/02      (2006.01)

(52) U.S. Cl. ............ 345/581; 348/422; 348/474; 348/512; 382/190

(58) Field of Classification Search ............ 345/581, 345/440, 589, 638–639, 475; 382/190, 232, 382/233, 254; 707/100, 3, 501.1; 715/716–720; 348/422–423, 412, 415, 425, 437, 438, 474, 348/500, 512–515; 386/68; 706/12, 20, 706/45

See application file for complete search history.

(56) References Cited

U.S. PATENT DOCUMENTS

| | | | | |
|---|---|---|---|---|
| 3,069,654 A | * | 12/1962 | Hough | 382/281 |
| 4,731,860 A | * | 3/1988 | Wahl | 382/281 |
| 5,054,098 A | * | 10/1991 | Lee | 382/289 |
| 5,179,419 A | * | 1/1993 | Palmquist et al. | 356/73.1 |
| 5,442,716 A | * | 8/1995 | Otsu et al. | 382/181 |
| 5,767,407 A | * | 6/1998 | Sinha | 73/579 |
| 5,966,139 A | * | 10/1999 | Anupam et al. | 345/440 |
| 6,278,446 B1 | * | 8/2001 | Liou et al. | 715/700 |
| 6,297,825 B1 | * | 10/2001 | Madden et al. | 345/419 |
| 6,347,313 B1 | * | 2/2002 | Ma et al. | 707/3 |
| 6,377,917 B1 | * | 4/2002 | Gimenez de los Galanes et al. | 704/220 |
| 6,445,809 B1 | * | 9/2002 | Sasaki et al. | 382/104 |
| 6,640,145 B2 | * | 10/2003 | Hoffberg et al. | 700/83 |
| 6,665,852 B2 | * | 12/2003 | Xing et al. | 716/12 |
| 6,678,413 B1 | * | 1/2004 | Liang et al. | 382/181 |
| 6,744,922 B1 | * | 6/2004 | Walker | 382/190 |
| 6,892,193 B2 | * | 5/2005 | Bolle et al. | 706/20 |
| 6,928,233 B1 | * | 8/2005 | Walker et al. | 386/69 |
| 6,996,171 B1 | * | 2/2006 | Walker et al. | 375/240.09 |
| 7,103,222 B2 | * | 9/2006 | Peker | 382/181 |

(Continued)

OTHER PUBLICATIONS

Zaiane et al., Mining multimedia data, IBM Centre for studies Conference, IBM press, pp. 1-7.*

(Continued)

*Primary Examiner*—Wesner Sajous
(74) *Attorney, Agent, or Firm*—Dirk Brinkman; Clifton D. Mueller; Gene V. Vinokur

(57) ABSTRACT

A method mines unknown content of a video by first selecting one or more low-level features of the video. For each selected feature, or combination of features, time series data is generated. The time series data is then self-correlated to identify similar segments of the video according to the low-level features. The similar segments are grouped into clusters to discover high-level patterns in the unknown content of video.

26 Claims, 6 Drawing Sheets

U.S. PATENT DOCUMENTS

| | | | |
|---|---|---|---|
| 7,143,352 B2* | 11/2006 | Divakaran et al. | 715/721 |
| 2002/0069218 A1* | 6/2002 | Sull et al. | 707/501.1 |
| 2002/0091680 A1* | 7/2002 | Hatzis et al. | 707/3 |
| 2003/0007555 A1* | 1/2003 | Divakaran et al. | 375/240.01 |
| 2003/0101144 A1* | 5/2003 | Moreno | 705/62 |
| 2003/0185450 A1* | 10/2003 | Garakani et al. | 382/232 |
| 2004/0041831 A1* | 3/2004 | Zhang | 345/723 |
| 2004/0073554 A1* | 4/2004 | Cooper et al. | 707/100 |
| 2004/0170385 A1* | 9/2004 | Bhadkamkar et al. | 386/68 |

OTHER PUBLICATIONS

Zhong et al., CLustering methods for video browsing and annotation, SPIE vol. 2670, pp. 239-246.*

Naphade et al., "*Probabilistic multimedia objects (multijects): A novel approach to indexing and retrieval in multimedia systems,*" Proceedings of the fifth IEEE International Conference on Image Processing, vol. 3, pp. 536-540, 1998.

Xu et al., "*Algorithms and Systems for Segmentation and Structure Analysis in Soccer Video,*" IEEE International Conference on Multimedia and Expo, Tokyo, Japan, Aug. 22-25, 2001.

* cited by examiner

VIDEO MINING USING UNSUPERVISED CLUSTERING OF VIDEO CONTENT

FIELD OF THE INVENTION

This invention relates in general to computerized video processing, and more particularly, to a method and system for mining video content.

BACKGROUND OF THE INVENTION

Data mining extracts information from large-scale databases and the Internet. Data mining has been applied to the analysis of market, financial, sensor, and biological data. Data mining should not be confused with pattern matching where data are searched for known patterns.

Fundamentally, data mining discovers "interesting" and previously unknown patterns in data. Interesting patterns are usually defined in terms of the reoccurrence rate of a particular pattern. Because data mining does not presume any pre-defined patterns, it is frequently described as unsupervised learning.

Data mining derives rules, trends, regularities and correlations from a large volume of data. Often, data mining is based on artificial intelligence (AI), memory based reasoning (MBR), association rule generation, decision trees (DT), neural analysis, statistical analysis, clustering, and time series analysis.

Clustering identifies homogeneous groups of related information in data. Prior art clustering assumes that relationships among the data are known. Clustering has been studied extensively in statistics, pattern recognition, and machine learning. Examples of clustering applications include customer segmentation for marketing analysis, and identification of sub-categories of signal databases in sensed data.

Clustering techniques can be broadly classified into partitional techniques and hierarchical techniques. Partitional clustering separates data into K clusters such that the data in each cluster are more similar to each other than to data in different clusters. The value of K can be assigned by a user, or iteratively determined so as to minimize the clustering criterion.

Hierarchical clustering is a nested sequence of partitions. Agglomerative hierarchical clustering places data in atomic clusters and then merges the atomic clusters into larger and larger clusters until all data are in a single large cluster. Divisive hierarchical clustering reverses the process by starting with all data in one cluster and subdividing the cluster into smaller clusters, see for example, Jain et al., "*Algorithms for Clustering Data*," Prentice Hall, 1988, Piramuthu et al., "*Comparison of SOM neutral network and hierarchical clustering methods*," European Journal of Operational Research, 93(2):402-417, September 1996, Michaud, "*Four clustering techniques*," FGCS Journal, Special Issue on Data Mining, 1997, and Zait et al., "*A Comparative study of clustering methods*," FGCS Journal, Special Issue on Data Mining, 1997.

Most data mining methods reduce the dimensionality of the input data. Clusters that are formed in a high-dimensional data space are not likely to be meaningful clusters because the expected average density of points anywhere in the high-dimensional data space is low. Known techniques for reducing the dimensionality of data include principal component analysis (PCA), factor analysis, singular value decomposition (SVD), and wavelets. Principal component analysis, also known as the Karhunen-Loeve expansion, finds a lower-dimensional representation that explains variances of data attributes, whereas factor analysis finds correlations among the data attributes. Jain et al., in "*Algorithms for feature selection: An evaluation, Technical report*," Department of Computer Science, Michigan State University, East Lansing, Mich., 1996, describe a technique for image analysis.

A popular data mining method used for analysis of consumer buying patterns is the identification of non-obvious associations, or association rules. An example of an obvious association is that consumers who buy baby formula also buy diapers at the same time. However, it was discovered in 1992 that beer and diapers are often purchased together in the evening hours. Such an association is a good example of a non-obvious association. Normally, one would not associate diapers and beer as strongly related purchase items because beer is usually not considered a baby formula. Such an approach has also been termed market-basket analysis.

An association is defined as follows. If there is a set of n items $I_1, \ldots, I_n$, and a transaction, e.g., a database or operation, that selects a subset of the n items, then an association between two items $I_i$ and $I_j$ is defined as a rule R for any transaction in both items $I_i$ and $I_j$ are selected into the subset. A condition of the rule R is defined as the occurrence of item $I_i$. A result of the rule R is defined as the occurrence of the item $I_j$. A support of the rule R is defined as a percentage of the transactions that have both items $I_i$ and $I_j$. A combination of the rule R is defined as the occurrence of both items $I_i$ and $I_j$ in the same transaction. A confidence of the rule R is defined as a ratio of the support of the combination and the support of the condition. Finally, an improvement of the rule R is defined as a ratio of the support of the rule over the product of the support of the condition $I_i$ and the support of the result $I_j$.

An association is strong when both the support and the confidence of the association are high. For example, for a grocery store transaction, milk is strongly correlated with every other item sold so the support is high, because most transactions include milk as an item. However, for some items, such as greeting cards, the confidence is low because these are bought infrequently.

Finally, the improvement of the association needs to be strong as well, because an improvement less than I indicates that the condition does not predict the combination with any better accuracy than by using the raw probability of the combination itself. So even if the support and confidence of the rule are high, without a corresponding improvement greater than 1, the rule offers no advantage over pure chance. Below, we describe the use of associations for "labeled clusters" of video features, instead of consumer "items."

Time series analysis correlates data values as a function of their temporal separation. For example, time series analysis has been used to discover patterns in stock prices, sales volumes, climate data, and EKG analysis. It is generally assumed that there is an underlying deterministic process that generated the time series and that that process is not random. However, time series data of real-world phenomena is often intermixed with non-deterministic data, for example, unavoidable random noise.

Typically, time series are compared using a similarity measure such as the Euclidean distances, or some variation thereof. However, Euclidean distance measurements tend to be unreliable. A more robust similarity measure is based on dynamic time warping (DTW), see Berndt et al., "*Finding patterns in time series: a dynamic programming approach*," Advances in Knowledge Discovery and Data Mining.

AAAI/MIT Press, Menlo Park, Calif. pp. 229-248, 1966. DTW attempts to align time series data by selectively stretching and shrinking the time axis.

Up to now, most data mining techniques have focused on textual data, numeric data and linear (one-dimensional) signals. However, a huge amount of information is now readily available in the form of multi-dimensional images, movies, and videos that have both space and time dimensions.

Some prior art techniques perform a rudimentary type content analysis on videos. The most common approach trains an expert system using a set of labeled samples, hence those techniques are based on supervised learning, and not unsupervised data mining see Xu et al., "*Algorithms and Systems for Segmentation and Structure Analysis in Soccer Video*," IEEE International Conference on Multimedia and Expo, Tokyo, Japan, Aug. 22-25, 2001, U.S. patent application Ser. No. 09/839,924 "*Method and System for High-Level Structure Analysis and Event Detection in Domain Specific Videos*," filed by Xu et al., on Apr. 20, 2001, and Naphade et al., "*Probabilistic multimedia objects (multijects): A novel approach to indexing and retrieval in multimedia systems*," Proceedings of the fifth IEEE International Conference on Image Processing, vol. 3, pp. 536-540, 1998.

Prior art unsupervised video analysis techniques are mostly content neutral. For example, videos have been summarized by selecting key frames from identified segments. There, the segments are determined by detecting scene or "shot" changes, e.g., fades or sudden changes in audio volume. What the scenes depict is immaterial. The particular frame selected is usually a good representative of the other frames in the shot according to some criterion. Other techniques exploit changes in camera angles or field of view, e.g., zooming. Such content-neutral techniques have had moderate success and require supplementary content-specific techniques for semantically satisfactory performance.

However, in general, the problems associated with content-based video mining are not well understood.

For example, it is unclear whether well-known classification and regression trees (CART) are applicable to video mining without considerable modification. The CART method splits independent variables into small groups of data sets, and fits a constant function to the small data sets. In categorical trees, the constant function is one that takes a finite small set of values, e.g., yes and no, or low, medium, and high. In regression trees, the mean value of the response is fit to small connected data sets.

Therefore, it is desired to provide a system and method for mining multi-dimensional time series data sensed from a scene, i.e., a sequence of frames acquired by a camera—a video. Video mining would be particularly useful for discovering interesting patterns in videos where an a priori model of the domain and content, such as editing models, characteristics of a news video, or patterns in a sports video, etc., are not readily available.

SUMMARY OF THE INVENTION

The method according to the invention mines unknown content of a video by first selecting one or more low-level features of the video. For each selected feature, or combination of features, time series data are generated. The time series data are then self-correlated to identify similar segments of the video according to the low-level features. The similar segments are grouped into clusters to discover high-level patterns in the unknown content of video.

DETAILED DESCRIPTION OF THE PREFERRED EMBODIMENT

Figure 1:
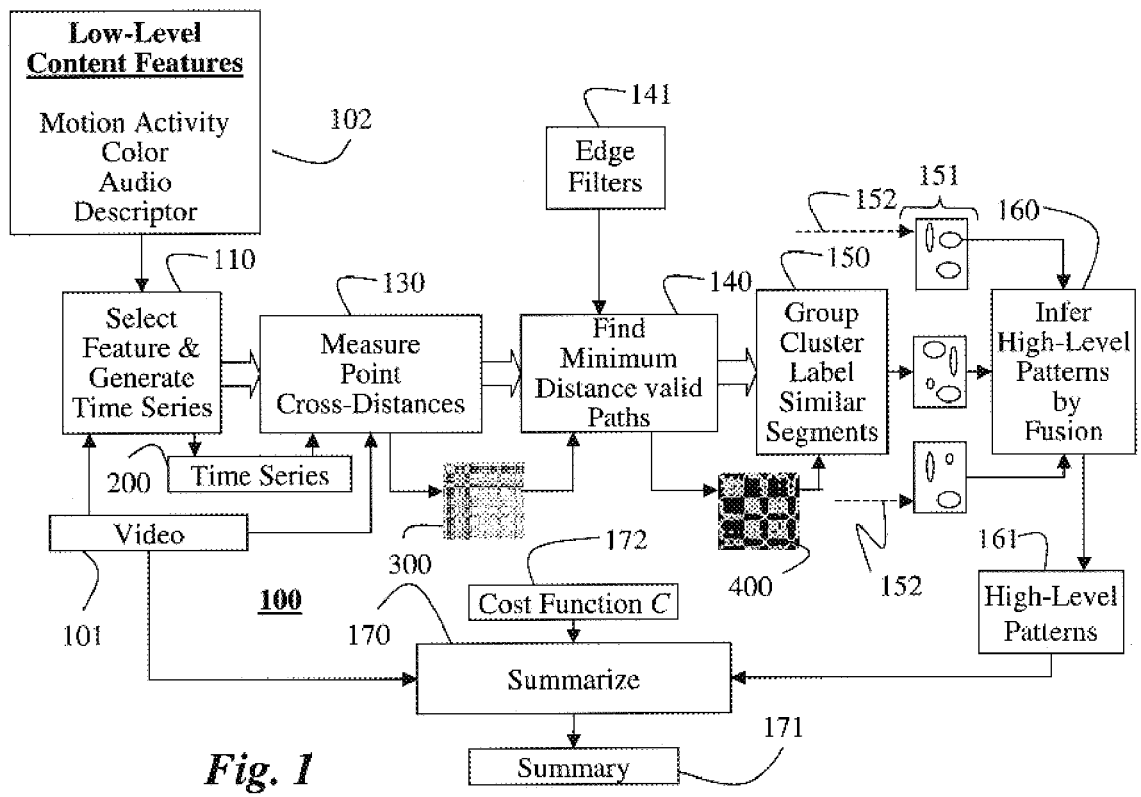
FIG. 1 is a flow diagram of a video mining method 100 according to the invention.

FIG. 1 shows the steps for a video mining method 100 according to our invention. Our invention is particularly useful for mining videos where patterns in the content are not known a priori, such as surveillance or home videos. The discovered patterns can be used for "blind" summarization of videos. By blind summarization, we mean that we do not need to know the content or genre of the video to be summarized. Our method is also useful for carefully prepared videos such as broadcast news, broadcast sports, feature films, etc. Thus, our method enables blind summarization of videos with a diverse range of variations in content and production styles.

We begin with a video 101 of arbitrary, and perhaps, unknown content and production style. The video includes visual and audio data. First, we select 110 a low-level feature 102 of the content, e.g., a group of features can consist of motion activity, color, audio, texture etc. such as MPEG-7 descriptors. Mining can be performed with one or more selected features 102, and the results 152 of each mining pass can be combined to infer 160 a higher level of understanding of the input video 101. We use the selected feature generate a time series 200 for the video 101.

Figure 2:
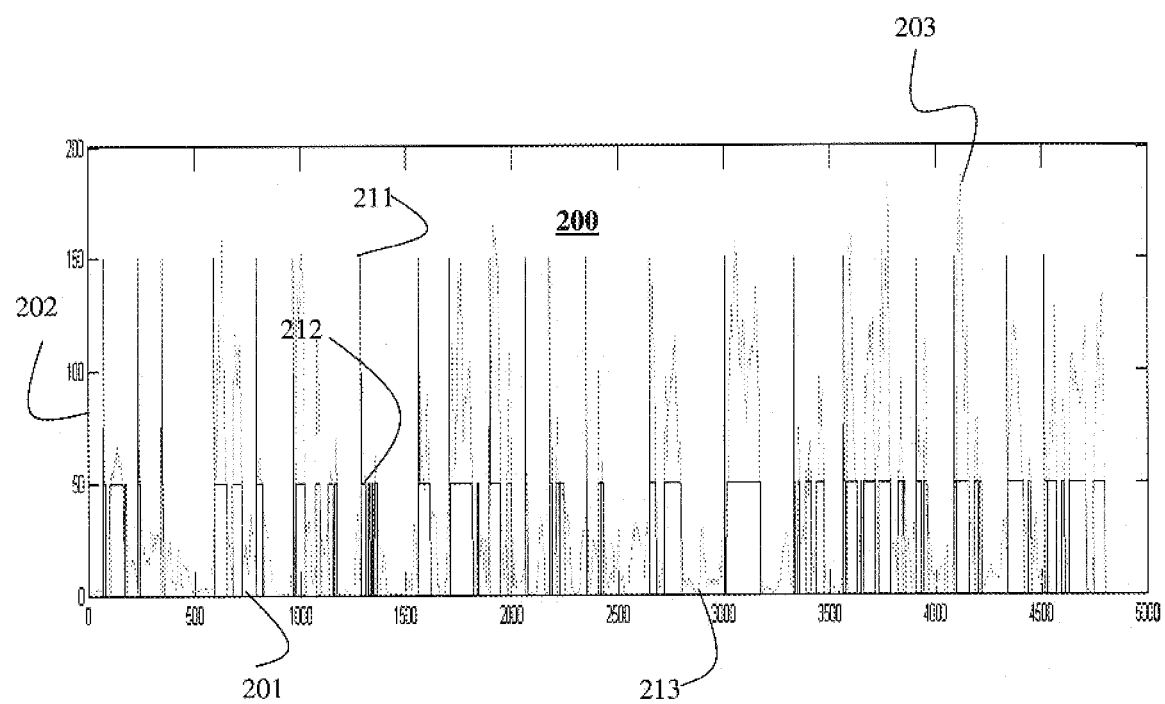
FIG. 2 is a time series diagram of a golf video.

FIG. 2 is an example of the time series 200 of a video of a golf game based on motion activity. FIG. 2 plots the level of motion activity in a golf video as a function of time. Time is indicated on the x-axis 201 in terms of frame numbers, and motion activity is indicated along the y-axis 202 as the average number of pixels moved in a macro-block since a previous frame. The raw motion activity is indicated by the plot 203. We threshold the motion activity data into high 211, medium 212, and low 213 levels of motion activity.

We observe long stretches of low motion activity followed by an abrupt rise in motion activity, and mark the rising edge with a spike as shown. Such spikes correspond to ball hits. Up until the ball is hit, the motion activity is typically very low. During and immediately after the ball hit, the camera moves quickly to follow the ball, hence the "rising edge" of motion activity.

According to our invention, motion activity in the sequence of frames of the video 101 constitutes a time series. A color histogram of the video frames is another multi-dimensional time series. Time-series data in a video can also include symbolic values such as semantic labels, e.g., MPEG-7 descriptors, and audio signals.

Our method 100 measures 130 similar expressions of the low-level features based on the time series 200 of the video, e.g., high, medium, or low in the case of motion, dominant blue, green, or brown colors could be another expression. We provide a "soft" matching where small differences do not necessarily invalidate a match. We do this by data smoothing or thresholding the low-level features 102, as described above. If multiple features are used, the time series data can be weighted. For example, in the final result, color can be given a greater weight than motion activity. Our coupling between the low-level features during the inference 160 is loose, and therefore, we prefer to apply our data mining to each of the features separately, and infer higher level patterns 161 by fusing 160 clustered data 151 obtained separately by video mining on the selected low-level features 102.

In contrast with the prior art, which only finds similar pairs at a given resolution, our matching finds 140 all possible matching pairs at all temporal resolutions in a large time series, such as the time series 200 obtained from the video.

To mine for all temporal pattern in the time series S(i) 200 103, we need multi-resolution windows of various sizes w, a. w:S(1:w), S(2:w+1), ..., S(N−w+1:N).

It should be noted that we do not explicitly construct the multi-resolution windows w. Instead, our windows w are implicitly defined by a cross-distance matrix 300, and what we do is find these implicitly defined windows. This enables us to find all matches at all resolutions. Our implicit window finding technique is described in greater detail below.

We measure 130 point cross-distances 300 between for the time series data 200 to find 140 minimum distances 400, and to cluster 150 the video 101 accordingly. The problem is how to find similarities where the multi-resolution windows have different sizes.

Figure 3:
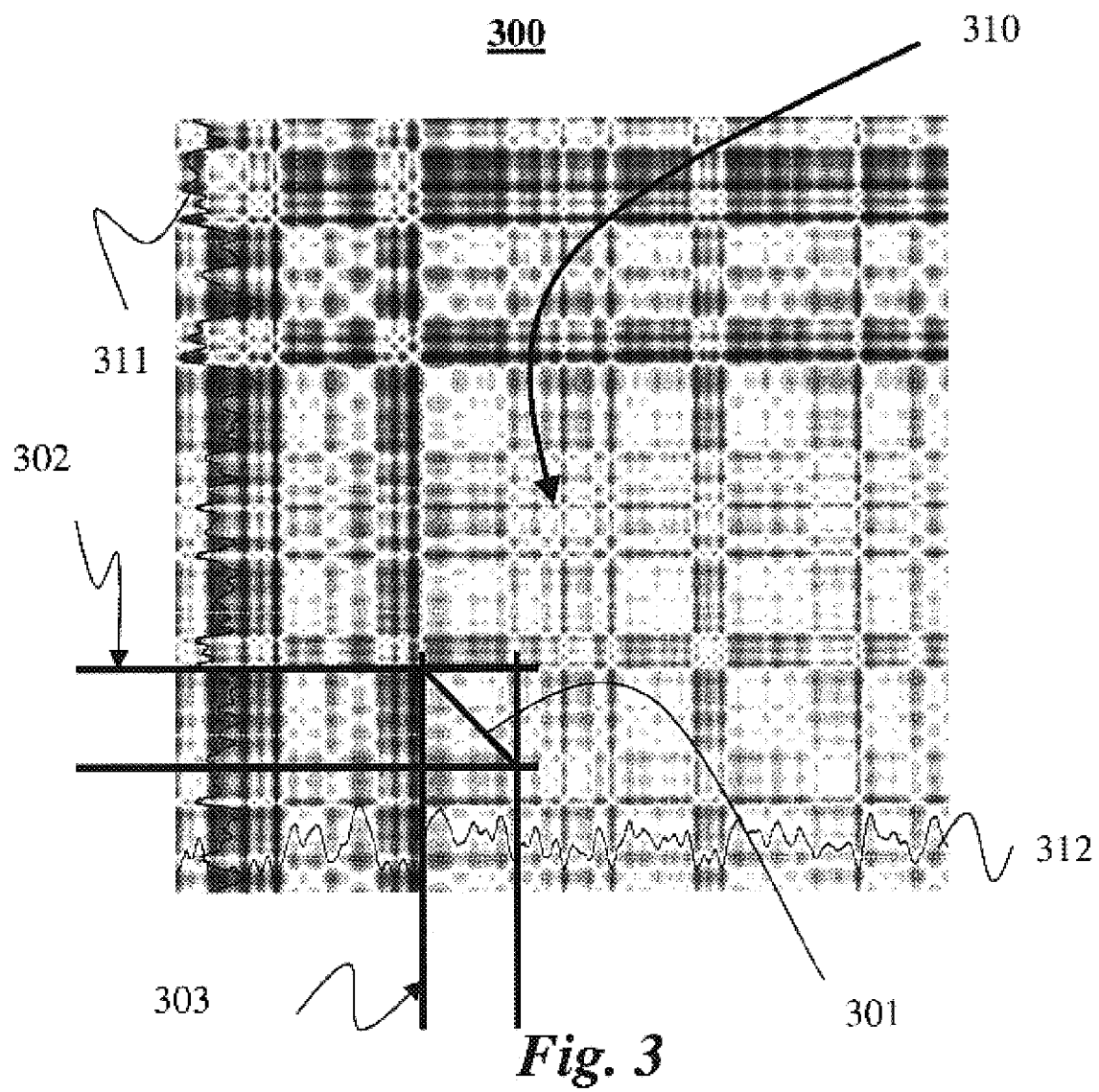
FIG. 3 is a point cross-distance matrix used by the invention.

As shown in FIG. 3, we solve this problem with the point distance matrix 300. A distance 301 between two windows 302-303 of size w is measured as:

$$D_w(x_i, x_j) = \sum_{k=0}^{w-1} (x_{i+k} - x_{j+k})^2.$$

Then, a. $D_1(x_i,x_j)=(x_{i+k}-X_{j+k})^2$, and $$\begin{aligned}&a.\ D_1(x_i, x_j) = (x_{i+k} - x_{j+k})^2, \text{ and} \\ &b.\ D_w(x_i, x_j) = \sum_{k=0}^{w-1} D_1(x_{i+k}, x_{j+k}).\end{aligned} \quad (1)$$

FIG. 3 shows the example point distance matrix 300 where one window 301 is $x_i$-$x_{i+w}$ and another window 302 is $x_j$-$x_{j+w}$. The line 301 represents equation (1). The curves 311 and 312 represent respectively the time series 200. That is, the same time series is along the x- and y-axis, in other words the measurement is self-correlating.

The point distance matrix 300 can be searched for diagonal lines of short point cross-distances. In the representation of FIG. 3, the distances are rendered on a gray-scale where shorter distances are lighter than large distance, hence, the major diagonal where all distances are zero is white, because the measurement is self-correlated.

As an advantage, the matrix 300 is not limited to any given window size w. Therefore, it is possible to find all possible diagonal paths of short distance values, where short is with respect to some threshold distance value $T_D$. If time warping is used the path can be "near" or substantially diagonal to the main diagonal 310 in FIG. 3.

Figure 4:
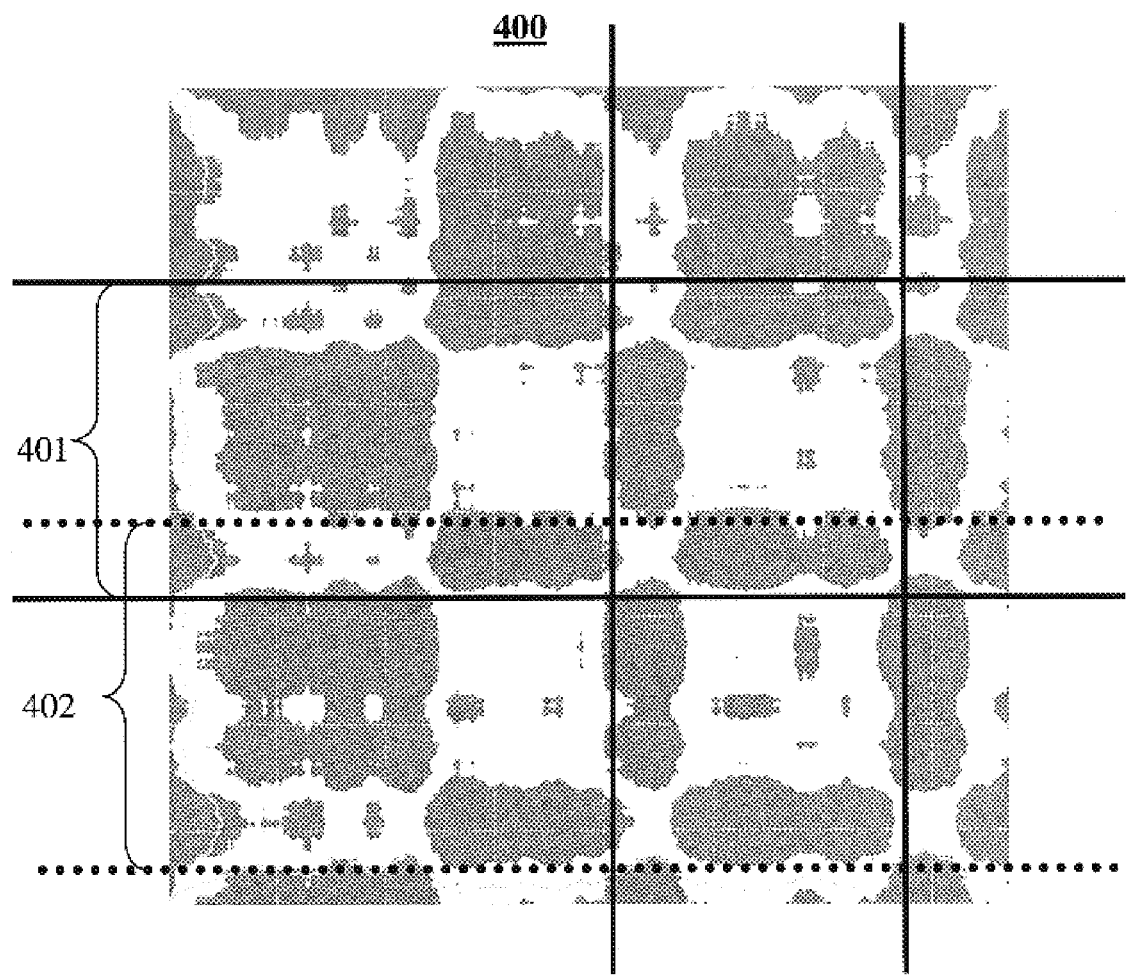
FIG. 4 is a point cross-distance matrix with repeating patterns.

As shown in FIG. 4, we perform multi-resolution analysis by sub-sampling the time series using multi-scale techniques, e.g., wavelets, adapted for our video content mining. This generates a smooth matrix 400. Our method automatically matches across different window sizes w to reveal all repeating temporal patterns 401-402 in the time series.

Dynamic time warping (DTW) is used to "stretch" and "compress" time, within certain limits, to allow for a good alignment between similar segments of the video having different lengths of time. Dynamic programming can be used to find the time warping of the segments that give a best match. DTW finds an optimum path in the grid under certain constraints a. (i,j), $1 \leq I \leq N, 1 \leq j \leq M$, where N and M are the lengths of two segments, and each grid point (i,j) is a distance between the $i^{th}$ and $j^{th}$ points in the two segments, respectively.

We find a minimum cost path between pairs of points in the point cross-distance matrix using dynamic programming. We want that path to be substantially diagonal, i.e., substantially parallel to the main diagonal 310. in addition, we want the path to pass through low cross-distance values in the matrix, where low is defined by some threshold value $T_D$. These paths are the white, or near white diagonal curve segments in FIGS. 3 and 4.

Figure 5:
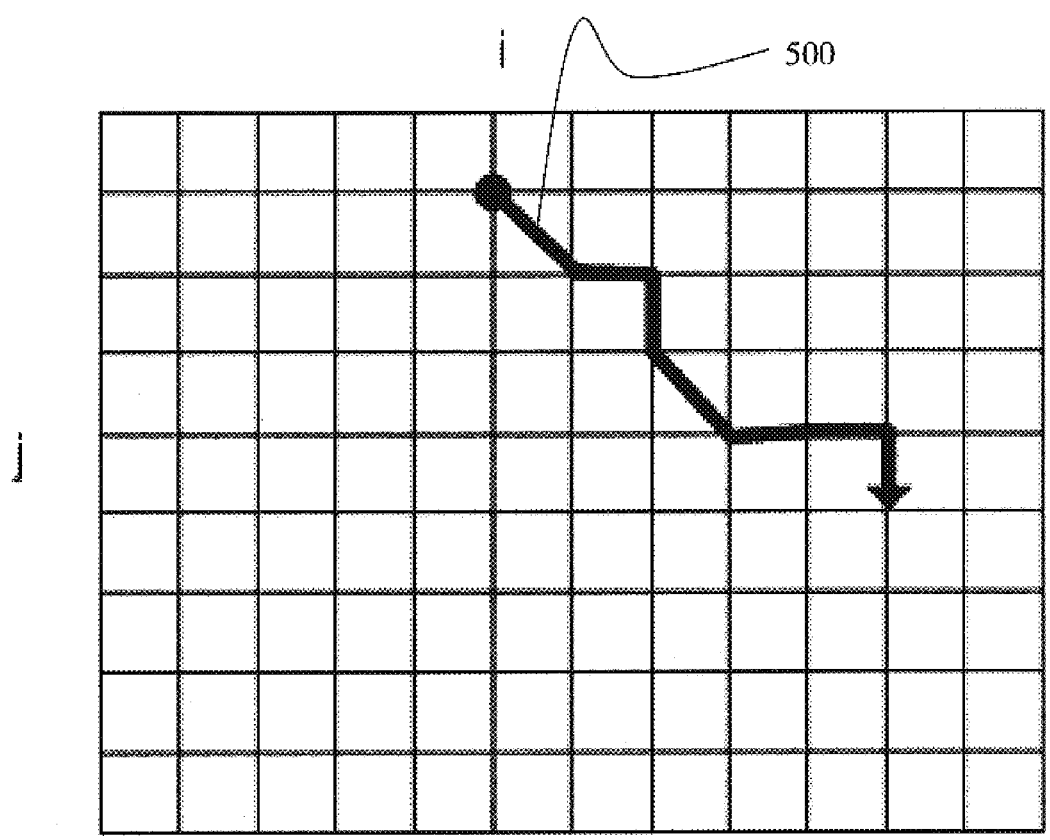
FIG. 5 is a graph of a near-diagonal minimum cost path.

A possible definition of the minimum cost is an average of the cross-distance values along the path. We also put some constraints on the allowed paths, i.e., the path 500 preserves an orientation in the diagonal direction, see FIG. 5. One possible set of constraints is that, at each step along the path can move down one, right one, or diagonally, as shown.

Figure 6:
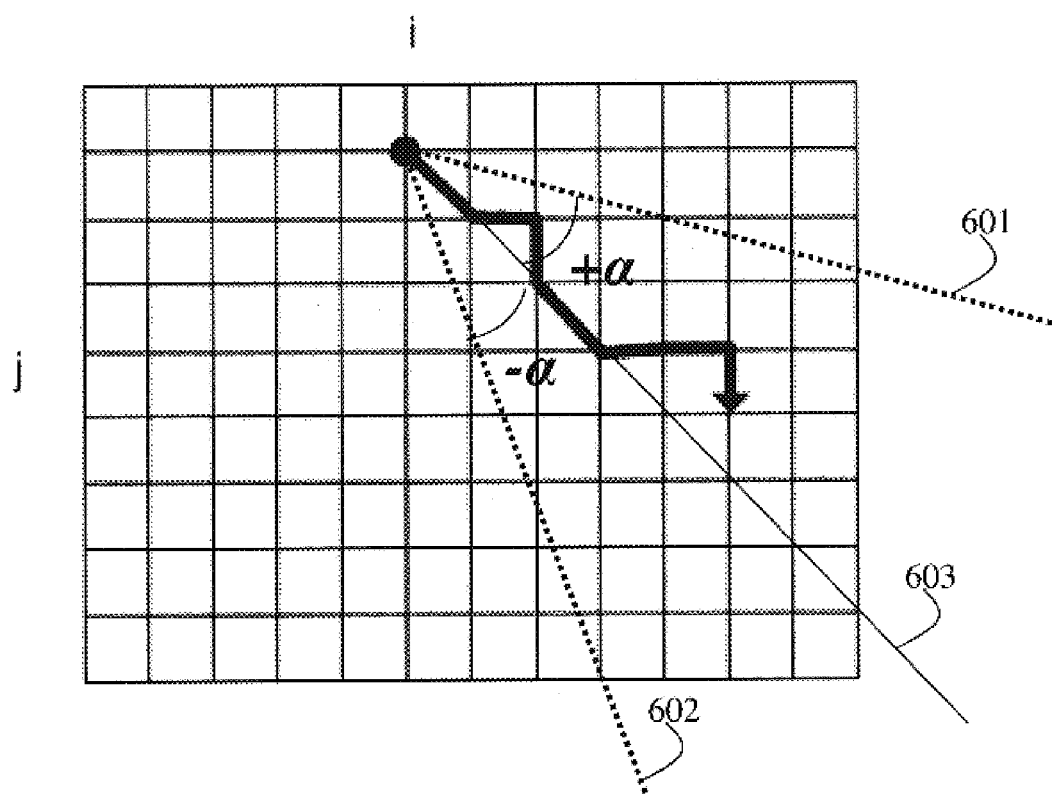
FIG. 6 is a graph of a minimum path with threshold angles.

Additionally as shown in FIG. 6, a threshold angle between the diagonal, and the line drawn between the two end points of the path, should be less than $\alpha°$, where $0 \leq \alpha \leq 45°$. Such path cost criteria and constraints can be formulated by dynamic programming to find the minimum cost valid path between two points in the point cross-distance matrix.

A valid path thus obtained, even if it is not exactly diagonal, specifies a dynamic time warping of two corresponding sub-sequences the time series. Hence, we find the appropriate time warping for a good match between two sub-sequences by using dynamic programming, and find the minimum cost path between two points in the cross-distance matrix.

Dynamic programming allows us to find the minimum cost path between two given points in the matrix. We are interested in finding the minimum cost paths between all possible pairs of points in the matrix, and select the ones that have a cost below a given threshold.

A brute force way of doing this is by running the dynamic programming process for each possible pair of points. Because the cross-distance matrix is symmetric, i.e., the distance between the $i^{th}$ and $j^{th}$ samples of the time series is equal to the distance between the $j^{th}$ and $i^{th}$ samples, we only need to process the upper half of the matrix, where there are only $N^2/2$ points, and $N^4/4$ point pairs. However, the number of processing steps can be reduced to increase the efficiency of our method.

First as shown in FIG. 6, we require the angle between the diagonal and the line passing through the two end points of the path to be less then $\alpha°$. Then, for each point, we find the minimum cost path to the points that are located between the lines at +α601 and −α602 degrees from the diagonal 603. Furthermore, we put the constraint that all the points on a path should have a value lower than the threshold T. In this case, we can threshold the whole matrix and find the minimum cost paths only between the set of points that are above the threshold.

After the minimum cost paths between all such points have been found, we merge shorter paths with end points close to each other into a longer path. We also merge paths where one is a superset of another. We eliminate paths where the Euclidean distance between the two end points is shorter then a certain length. The remaining set of paths provides us with all pairs of similar sub-sequences in the video at multiple resolutions.

In the prior art, the similarity using dynamic time warping (e.g., by finding a minimum cost path in the cross-distance matrix using dynamic programming) is done for querying a given time sequence pattern in a larger time sequence, see Park et al., "*Efficient search for similar subsequences of different lengths in sequence databases*, International Conference on Data Engineering (ICDE), pp. 23-32, 2000.

Our technique can also be used for finding a good alignment between two sequences in the context of speech analysis, see Sakoe et al. "*Dynamic programming algorithm optimization for spoken word recognition*," IEEE Trans. Acoust., Speech, Signal Process., ASSP 26, pp. 43-49, 1978, and gene and protein sequence analysis, see Aach et al., "*Aligning gene expression time series with time warping algorithms*," Bioinformatics, 17:495-508, 2001. However, those methods find only one path with a given starting point, in a given cross-distance matrix, in contrast, we find all paths.

In the prior art, self-similarity of sub-sequences in time series is usually computed using a fixed window size w, and computing the cross-distances between shifted windows on the original sequence, see Agrawal et al., "*Efficient Similarity Search in Sequence Databases*," Proc. of the 4$^{th}$ Int'l Conference on Foundations of Data Organization and Algorithms, and "*Lecture Notes in Computer Science,*" 730, Springer Verlag, p., 69-84.

Other prior art use of cross-distance matrix is in the form of dot-plots where the matrix elements are either 1 or 0, indicating an exact match or no match. They have been used for qualitative analysis and as visual tools, see Church et al., "*Dotplot: A program for exploring self-similarity in millions of lines of text and code*," Journal of Computational and Graphical Statistics, 2(2):153-174, 1993., or for segmenting self-similar regions along the diagonal but not for automatically finding pairs of similar sub-sequences, see Jeffry, "*An Automatic Method of Finding Topic Boundaries*" Proceedings of the 32$^{nd}$ Annual Meeting of the Association for Computational Linguistics, 1994. Our method can be used for any of these applications.

A Hough transform could be applied to merge multiple short paths into curves. The Hough transform isolates features of a particular shape within the matrix 400. We could use the Hough transform because a simple analytic description of the features is not possible. As an advantage, the Hough transform is tolerant to gaps in feature boundary descriptions and is relatively unaffected by noise in the data. In addition, the Hough transform is particularly useful for discovering a global description of the features, where the number of solution classes is not known a priori, as is the case here.

Our motivation for using the Hough transforms is that each input distance feature indicates its contribution to a globally consistent pattern. We implement the Hough transform by quantizing the feature space into finite intervals or accumulator cells that reveal a discretized path as the accumulator cells which lie along this path are incremented. Resulting peaks in the accumulator array represent strong evidence that a corresponding path exists in the feature space. We use the Hough transform to identify the paths which best fits a set of given edges.

Of course it should be understood that other techniques for finding matching segments using self-correlation of the time series could be used. For example, a dot product could be used. In this case the magnitude of the product is indicative of the level of similarity. For multi-dimensional time series such as color histograms of consecutive frames, histogram intersection could be used.

After we find the matching windows using DTW, we group and label 150 similar segments into clusters 151. By a segment we mean a sequence of frames in the video that directly corresponds to a window having similar features. Thus, the identification of the similar segments using the time series data essentially allows us to partition the video and group similar segments into clusters.

We use the term "label" and "item," as defined above for associations, equivalently. When we refer to clusters, we imply that the clusters are labeled, e.g., a cluster of high motion activity frames, or a cluster of loud noise in the sound track of the video. Using associations and fusion of labels 152 obtained using different features allows us to infer 160 high-level patterns 161 in the clusters 151. These patterns can then be used for blind summarization 170 of the video 101 into a summary 171. The summarization essentially extracts selected frames of the video according to the high-level patterns 161.

In step 160, we find associations between labels of the clusters. One type of association looks for "labels" that correlated in time. The correlation can either be simultaneous, or time shifted, e.g., a lot of motion and loud noise signals an "action" event in a entertainment video, or a lot of motion later followed by applause and cheering signals a "scoring" event in a sports video.

We find associations between labels as follows. The label for each cluster is considered equivalent to an "item" as stated above. Thus, we generate a condition including the occurrence of the label $L_i$ and a result including the occurrence of a label $L_j$. In this case, every point on the time axis has a corresponding transaction, which includes labels corresponding to more than one of the video features 102.

For example, we could have two sets of labels, the first one corresponding to a description of motion activity as high, medium or low and the second one related to audio semantic classes where the label would indicate membership in an audio class such as applause, cheering, music, etc. Then, we can find an association between high motion activity and applause/cheering in a sports video. Note that even if more sophisticated labels are used, the association can be found through a straightforward computation. It is also possible to find compound associations between combinations of labels.

Then, a strong associations can help us find corresponding common and uncommon patterns in the video 101, because the more common the pattern, the higher the support.

Then, the summary 171 of the video 101 contains a combination of the common and uncommon events depending on the needs of the user. In one extreme, the summary 171 contains rare events with strong associations. In another extreme, the summary contains common events with strong associations.

Therefore, the clustering 150 begins by clustering all similar segments based on the distance metric as described above. Partially overlapping segments are divided so that they either have an identical overlap, or none at all. Pairs of clusters can be merged using an agglomerative procedure to form bigger clusters. We define a set S to contain all segments that are in at least one of the similar pairs of clusters. Then, the set $S^c \cup S$ is the entire video 101, and the set $S^c$ is the complement of the set S. The clusters are labeled, e.g., A, B, C, . . . and $A \cup B \cup C \ldots = S$. The set $S^c$ can be considered a "junk" cluster that is not as "meaningful" with respect to the labels A, B, and C, etc.

Thus, the clustering 150 produces the set S of non-overlapping segments of various lengths, and their mutual distances. Each cluster 151 has the following associated parameters: cluster compactness, i.e., how similar are the segments in the cluster; number of segments in the cluster; total length of the segments (frames or time) in the cluster; and average distance between the closest points of the segments which indicates the spreading of the segments in the entire video.

Each segment in a cluster has the following parameters: average distance to other cluster center, which indicates how representative the segment is of the cluster in which it is contained; and its length (frames or time).

Then, a summarization cost function C 172 can trade-off an absolute difference between a required summary length, a total length of a set R of selected segment to be included in the summary 171, (i.e., $R \subset S$), an average of the distances between each segment in S and a closest segment in a set R. This indicates how well the set R (summary 171) represents the set S, which, of course, is the entire video 101. We can add a term to favor compactness of R in time, or the opposite. The summary 171 then is the subset R of set S that minimizes the cost function 172.

The summary can then be used for new modalities of video control such as "smart" fast-forward and reverse, and instant repositioning in the face of no a priori domain knowledge.

It is to be understood that various other adaptations and modifications may be made within the spirit and scope of the invention. Therefore, it is the object of the appended claims to cover all such variations and modifications as come within the true spirit and scope of the invention.

We claim:

1. A method for mining content of a sequence of frames of a video, comprising:
   selecting a low-level feature of the content of the sequence of frames of the video;
   generating time-series data from the content of the sequence of frames of the video, the time series data comprising the selected low-level feature;
   implicitly constructing windows for the time-series data, in which the windows are multi-resolution, a distance D between two windows of size w at points $x_i$ and $x_j$ in the time series data is measured as $$D_w(x_i, x_j) = \sum_{k=0}^{w-1} (x_{i+k} - x_{j+k})^2,$$

and k is an index for the points $x_i$ and $x_j$ in the windows;
   self-correlating the time-series data, using the multi-resolution windows, to determine similar segments of the sequence of frames of the video according to the low-level feature, and wherein all similar segments are found at a plurality of temporal resolutions; and
   clustering the similar segments to discover high-level patterns in the content of the sequence of frames of the video.

2. The method of claim 1 wherein the content of the sequence of frames of the video is unknown.

3. The method of claim 1 wherein a production style of the sequence of frames of the video is unknown.

4. The method of claim 1 wherein the video includes video and audio data.

5. The method of claim 1 wherein the low-level feature is selected from a group consisting of motion activity, color, texture, audio, semantic descriptors, and combinations thereof.

6. The method of claim 1 further comprising:
   thresholding the low-level feature.

7. The method of claim 1 further comprising:
   smoothing the time-series data.

8. The method of claim 1 further comprising:
   weighting the time-series data.

9. The method of claim 1 further comprising:
   selecting a plurality of low-level features of the content of the sequence of frames of the video;
   generating the time-series data from the content of the sequence of frames of the video for each of the selected low-level features;
   self-correlating the time series data for each of the selected low-level features to determine similar segments of the video according to the plurality of low-level features; and
   clustering the similar segments to discover the high-level patterns in the content of the video.

10. The method of claim 9 further comprising:
    associating the plurality of sets of clusters to infer the high-level patterns.

11. The method of claim 1 further comprising:
    self-correlating the time-series data in a point cross-distance matrix to measure the point cross-distances.

12. The method of claim 11 wherein the point cross-distances are represented by substantially diagonal lines in the point cross-distance matrix.

13. The method of claim 1 further comprising:
    time warping the time-series data to find the similar segments.

14. The method of claim 13 wherein the time warping is performed by dynamic programming.

15. The method of claim 1 further comprising:
    merging the similar segments using a Hough transform on the time-series data.

16. The method of claim 1 further comprising:
    labeling the clusters.

17. The method of claim 16 further comprising:
    correlating the labels in time.

18. The method of claim 17 wherein the time correlation is simultaneous.

19. The method of claim 17 wherein the time correlation is time shifted.

20. The method of claim 17 further comprising:
    generating conditions and results of occurrences of the labels to discover the high-level patterns.

21. The method of claim 1 further comprising:
    summarizing the sequence of frames of the video according to the high-level patterns.

22. The method of claim 1 wherein the self-correlating further comprises:
    measuring point cross-distances in the time series-data.

23. The method of claim 1 wherein the self-correlating further comprises:

forming a cross-product of the time-series data.

24. The method of claim 1 wherein the time-series data is a color histogram of consecutive frames in the video, and the self-correlating further comprises:

intersecting the color histogram with itself.

25. The method of claim 1 wherein the time-series data is a function of the low-level feature and the frames of the video.

26. The method of claim 1 wherein the time-series data is multi-dimensional.

* * * * *